Dec. 18, 1956     J. T. WALLMARK     2,774,908
CATHODE-RAY TUBES OF THE FEED-BACK VARIETY
Filed March 30, 1955
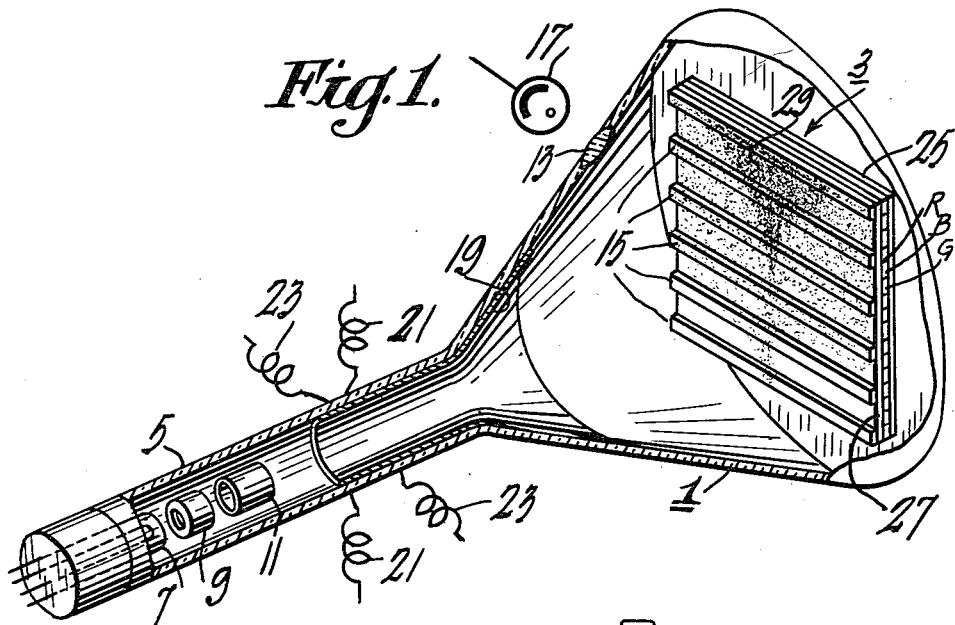
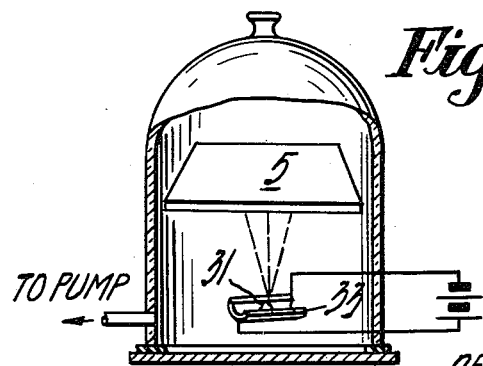
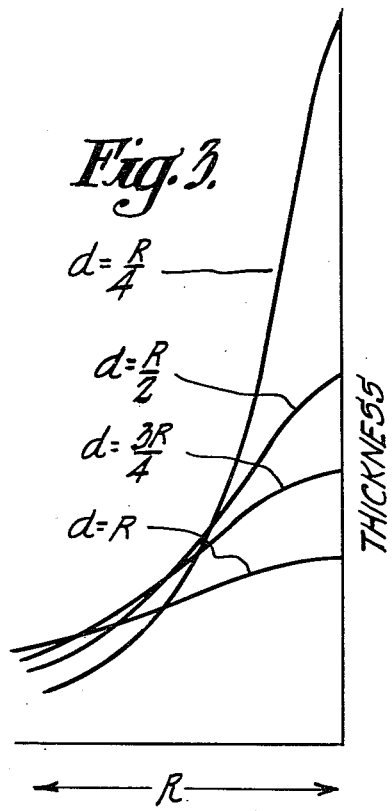
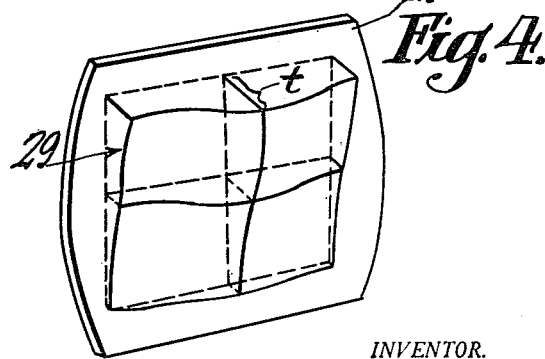
INVENTOR.
John T. Wallmark
BY Roderick Malcolm
ATTORNEY

United States Patent Office 2,774,908
Patented Dec. 18, 1956

2,774,908

CATHODE-RAY TUBES OF THE FEED-BACK VARIETY

John T. Wallmark, Princeton, N. J., assignor to Radio Corporation of America, a corporation of Delaware Application March 30, 1955, Serial No. 497,946

4 Claims. (Cl. 315—10)

This invention relates to improvements in cathode-ray (CR) tubes of the feed-back variety.

The control or "error" signals picked-up from the signal generating indicia on the target surface of present day CR tubes of the subject variety vary in intensity or amplitude as determined by the distance between the pick-up area and the area of origin of said signals. The unequal amplitude of the signal from different parts of the target has heretofore been corrected by a "limiter" either in or after the pickup device. For some feed-back circuits, e. g. where the amplitude of the error-signal is a measure of the extent of the error, a limiter can not be used.

Accordingly, an object of the present invention is to provide an improved CR tube of the feed-back variety and one wherein the signals derived from its signal generating indicia are of substantially uniform intensity irrespective of the distance between the pick-up device and the area of origin of said signals.

Stated generally, the foregoing and related objects are achieved in accordance with the invention by the addition to an electron-sensitive signal generating target electrode of a signal attenuating coating, the thickness or density of which varies inversely with its distance from the signal pick-up device or area.

The invention is described in greater detail in connection with the accompanying single sheet of drawings, wherein:

Fig. 1 is a broken-away view in perspective of a UV (ultra-violet) feed-back color-kinescope provided, in accordance with the invention, with a signal attenuating coating on its signal-emissive target surface;

Fig. 2 is an elevational view, partly in section, of an evaporator for laying down the signal attenuating coating on the target surface of the screen of the tube of Fig. 1;

Fig. 3 is a family of curves showing the thickness and/or density distribution of the evaporated layer as achieved with the evaporator mounted at four separate distances from the screen, and Fig. 4 is a topographical view in perspective of the screen of Fig. 1 showing the relative thickness of the signal attenuating layer at different points or regions on the screen.

In the drawings the invention is shown as applied to an ultra-violet (UV) feed-back color-kinescope, comprising an evacuated glass envelope having a bulbous portion or main chamber in the form of a frustum of a hollow conical body 1 which contains the later described graded signal-generating screen 3 of the invention, and a neck portion 5 containing the cathode 7, grid 9 and first anode 11 of an electron gun.

As is conventional the main chamber or bulbous part of the envelope contains a signal pickup area which here takes the form of a hermetically sealed port, window, or lens 13 through which ultra-violet light, emanating from signal-generating indicia 15 on the rear or target surface of the screen 3 passes to a photocell 17, here shown on the outside of the envelope. Other conventional features of the tube of Fig. 1 are (i) a second anode in the form of a conductive coating 19 on the inner surface of the main chamber 1 and neck 5, and (ii) the horizontal and vertical deflecting coils 21 and 23, on the neck of the tube, for imparting the requisite screen-scanning movements to the electron beam (not shown).

The screen here shown is of the line-screen variety and comprises a transparent foundation plate 25 (which may be the front end or window of the tube) having a multiplicity of groups of three parallelly arranged phosphor lines of different color-response characteristics, e. g. red (R), blue (B) and green (G) on its rear or target surface. An electron transparent light-reflecting aluminum layer 27 of substantially uniform thickness is provided on the back of the color phosphors and the signal-generating indicia 15 are laid down as through a stencil (not shown) on top of the conductive layer 27, e. g. in register with a particular one, or between two of the color phosphors in each group.

The signal generating indicia 15 are preferably but not necessarily constituted of zinc oxide or other (e. g. calcium magnesium silicate) ultra-violet phosphor having a rapid light-decay characteristic.

If the electron-sensitive screen of Fig. 1 were of conventional construction the ultra-violet signals generated by impact of electrons upon the indicia 15 would be of substantially uniform amplitude at their point of origin but of different amplitude if measured at the external pick-up device or at the internal "pick-up area," i. e. adjacent to the window or lens 13. That is to say, the amplitude of the signals at the pick-up device normally would fall off approximately as the square of the distance between said device and the area of origin of the signal. Thus, the signals of maximum intensity would be derived from those portions of the signal-generating indicia 15 that lie adjacent to the upper central part of the screen, where the distance to the photocell 17 is shortest, and signals of progressively lesser intensity would be derived from the indicia on the more remote portions of the target.

The present invention minimizes differences in the effective amplitude of the signals, derived from different parts of the screen, by the application of a graded signal attenuating layer 29 to the signal generating target surface or indicia 15. The density or thickness of the signal attenuating layer 29, and hence the effective emissivity of the underlying signal generating indicia 15, is a function of the distance from the pick-up area 13 to the particular part of the target 3 from which the signals are derived. That is to say, the attenuating layer 29 is made of maximum thickness or density in the region whereat it is closest to the pick-up area 13 and of lesser thickness or density at regions progressively more remote from said area. The signal attenuating layer 29 preferably comprises a thin (0–100 A.) light absorbing metal layer, preferably but not necessarily constituted of evaporated aluminum.

As above mentioned, the layer 29 should have a thickness distribution as the inverse of the amplitude of the signal in absence of such a layer. This can be obtained to a first approximation by choosing the mounting point for the aluminum 31 in the evaporator 33 (Fig. 2) at a correct position with regard to the screen 3. In this connection it should be borne in mind that in the absence of a signal attenuating layer 29 the weakest signals (at the pick-up area) are those emanating from the remote corner regions on the screen. Therefore the aluminum to be evaporated should be placed at a point where very little, if any, of the signal absorbing metal reaches the corners of the screen. A second requirement as to the location of the evaporable metal 31 is that it should not be arranged so close to the screen that all of the evaporated metal is confined to that small part of the screen that is closest to the pick-up area. In applying the invention to a 12" x 16" flat color screen wherein the pick-up area 13 (Fig. 1) was located 7" in back of the screen in line with the central axis of the tube, the evaporable metal 31 was placed 3" back of the screen and about 6" from its center.

Fig. 3 shows the thickness distribution of an evaporated layer 29 (Fig. 4) with the evaporable metal 31 (Fig. 2) mounted on four separate distances (d) from the screen. Where a 5 percent reduction of the signal from the edge of the screen was accepted, a mounting distance of R/4, where R is the screen radius, gave a reduction in the center of approximately 80 percent. This eliminated a signal difference of originally 5:1. This equalization of signal strength had the character of a first order approximation, leaving second order variations uncorrected. However, it is entirely possible to carry the equalization to any desired degree of accuracy, e. g. by evaporation through a mechanically geared shutter (not shown) or by utilizing several evaporations.

What is claimed is:

1. A cathode-ray tube comprising a target electrode having electron-sensitive signal-emissive areas arranged thereon at different distances from a common pick-up region for signal energy emanating from said areas, and means within said tube for equalizing the intensity of the signal energy transmitted to said common pick-up region through said different distances.

2. A cathode-ray tube comprising an electron-sensitive screen having a signal-emissive target surface, means defining a signal pick-up area unequally spaced with respect to different portions of said target surface, and a signal attenuating coating on said signal emissive target surface, the attenuating properties of said coating varying inversely with its distance from said pick-up area.

3. A color-kinescope comprising an evacuated envelope having a neck portion containing an electron gun and a bulbous portion containing a color-screen having an ultra-violet signal generating target surface disposed in a position to be scanned by beam-electrons from said source, means defining a signal pick-up region in the path of ultra-violet signals released by impact of said beam-electrons upon said signal generating target surface, and an electron-transparent metallic layer of non-uniform thickness superimposed upon said signal-generating target surface for differentially attenuating said ultra-violet signals in proportion substantially to the proximity of their area of origin to said pick-up region.

4. The invention as set forth in claim 3 and wherein said electron-transparent metal layer comprises aluminum of a thickness distribution of from approximately zero Angstrom units at a region remote from said pick-up area to substantially no more than one-hundred Angstrom units at the region that lies closest to said pick-up area.

References Cited in the file of this patent

UNITED STATES PATENTS

| | | |
|---|---|---|
| 2,633,547 | Law | Mar. 31, 1953 |
| 2,634,325 | Bond et al. | Apr. 7, 1953 |
| 2,689,314 | Gunderson | Sept. 14, 1954 |

FOREIGN PATENTS

| | | |
|---|---|---|
| 713,641 | Great Britain | Aug. 18, 1954 |